Dec. 23, 1952     H. T. FAUS     2,622,707

LIQUID MAGNETIC DAMPER

Filed Feb. 28, 1950

Inventor:
Harold T. Faus,
by Russell A. Warner
His Attorney.

Patented Dec. 23, 1952

2,622,707

UNITED STATES PATENT OFFICE 2,622,707

LIQUID MAGNETIC DAMPER

Harold T. Faus, Lynn, Mass., assignor to General Electric Company, a corporation of New York Application February 28, 1950, Serial No. 146,748

3 Claims. (Cl. 188—90)

My invention relates to apparatus for damping the intermittent or continuous rotation of shafts and the like such, for example, as the shaft of an indicating or integrating type measuring instrument, and its object is to provide a reliable damper which will occupy small space, is light in weight, gives damping which may be made proportional to the square of the speed, and which is little influenced by temperature changes. In carrying my invention into effect, I provide a hollow shaft section, the cavity of which contains a damping fluid such as oil; within this oil is a magnetic rotor member which is usually held from rotation with the shaft by external stator magnetic means such that fluid friction occurs between the liquid and the parts in contact therewith when the shaft is rotated. By suitable construction, the fluid friction damping may be modified by other types of damping.

Figure 1:
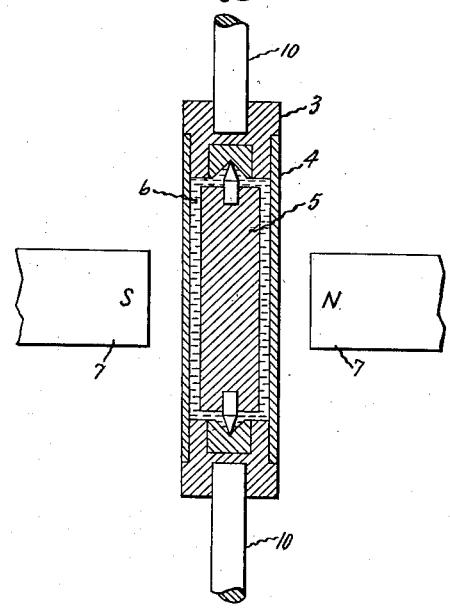
Figure 3:
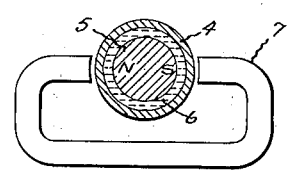
Figure 4:
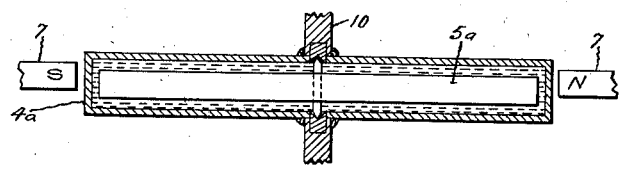

The features of my invention which are believed to be novel and patentable will be pointed out in the claims appended hereto. For a better understanding of my invention, reference is made in the following description to the accompanying drawing in which Fig. 1 represents a side view partially in section of a preferred modification of my invention, and Fig. 2 a cross-sectional view through the rotor element of Fig. 1. Figs. 3 and 4 represent other modifications of my invention.

Figure 2:
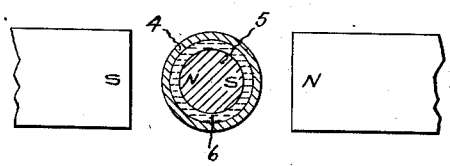

Referring now to Figs. 1 and 2, 10 represents a rotatable shaft which may be the shaft of an indicating type measuring instrument where rotation is oscillatory, or of an integrating type meter where the rotation is generally continuous in one direction. Included in the shaft as a section thereof and symmetrical with the axis of rotation is a cylindrical hollow portion of enlarged diameter shown as made up of end sections 3 and a connecting shell part 4. Pivoted between the end sections 3 is a magnetic rotor part 5. The part 5 is pivoted on the axis of rotation of shaft 10 and has a maximum diameter less than the inside diameter of the shell part 4 such that rotor part 5 is freely rotatable with respect to the shaft. Part and preferably all of the remaining space within the hollow shaft section is filled with a fluid 6 which is preferably oil of a type which does not change in viscosity with temperature variations to any appreciable extent over the range of temperature variation to be encountered by the device. The hollow shaft section is sealed liquid-tight to prevent the escape of oil. Silicone oil may be used for this purpose. Adjacent and external to the hollow shaft section and spaced therefrom is a stationary magnetic stator member having pole pieces 7 on diametrically opposite sides of the hollow shaft section. The purpose of the internal and external magnetic members is to resist rotation of the internal magnetic member, and any suitable arrangement of the magnetic members for this purpose may be employed. One or both internal and external magnetic members may be permanent magnets. In case the internal member 5 is a permanent magnet, it will be polarized across its pivoted axis as represented in Fig. 2 and may have a circular or oblong cross section. Fig. 2 indicates both magnetic parts as permanent magnets, and it will be evident that in case the shaft 10 is rotated, the fluid within shell 4 will tend to rotate part 5 by fluid friction but that the magnetic flux between the magnetic parts will hold part 5 stationary. Except in special cases to be mentioned hereinafter, it will be assumed that the shell part 4 is made of nonmagnetic, nonconducting material such as plastic, glass, or the like, or of a nonmagnetic metal having high resistance such that it produces negligible eddy current damping.

The weight of the internal rotor part 5 is in part supported by the liquid 6 so that in any event the weight of part 5 on its lower pivot is small. However, it is a simple matter to adjust the vertical position of the external stationary magnetic member to produce any magnetic suspension or lifting action on the internal rotor part 5 that may be necessary to relieve the pivot bearings of part 5 from all weight so that they simply serve as guide bearings, and it is assumed that this is done in all cases whether the shaft be vertical, as shown, or horizontal. The oil fluid used as damping liquid serves also to lubricate the pivots of rotor element 5. Hence, mechanical friction and wear in the device are negligible factors.

When shaft 10 is rotated, the rotor element 5 will thus remain stationary and damping, consisting of fluid friction on the internal wall of shell 4 and the external wall of element 5, will occur. The fluid friction damping produced will be proportional to the square of the speed since this is the law of fluid friction over a wide range of speed. This form of damper and its damping law will be useful in certain meter applications as, for example, in an ampere square hour meter to obtain an integration proportional to amperes. Due to its small size and weight, it will also be advantageous for use in indicating type instruments.

Of course, it is not essential that both the rotor element 5 and the outer stationary stator magnetic parts be permanent magnets. Fig. 3 represents a modification where the internal rotor 5 is a permanent magnet and the outer stationary magnetic part is a simple, soft iron magnetic yoke with its pole pieces 7 approaching the shell 4 on diametrically opposite sides thereof. Likewise, the outer part may be a permanent magnet and the inner rotor part a bar or oblong soft iron part.

This latter arrangement is represented in Fig. 4 where 7 represents the pole pieces of an external permanent magnet and 5a a bar of soft iron pivoted at its center within the hollow liquid filled cylindrical casing 4a. Comparing Figs. 1 and 4, it is also seen that the damper may be long in the axial direction and of small diameter, or short in the axial direction and of large diameter so that its shape can be readily adapted to a variety of space requirements and still obtain a substantial amount of liquid damping. In Fig. 4, I have emphasized the elevation of the stationary magnet poles 7 relative to rotor element 5a to illustrate magnetic lifting action on the latter. If the rotor 5 or 5a be relatively light in weight as, for example, by the use of sintered oxide and the fluid rather heavy, it might be necessary to lower the outer magnetic poles relative to the rotor to balance the floating effort of the rotor and while such balancing distribution is not noticeable in Figs. 1 and 2, it will nevertheless be present. That is, the outer stationary magnetic part may be so adjusted vertically relative to the rotor 5 as to substantially relieve any pressure on either the upper or lower pivot bearing thereof due to the difference in weight of the rotor and the liquid which it displaces whether the axis of rotation be horizontal or vertical.

In the above discussion, it was assumed that the shells 4 and 4a were made of nonmagnetic, nonconducting material and that pure fluid friction damping resulted. The fluid friction damping may be augmented and modified in a relatively simple manner. If, for example, the shell part 4 or 4a be made of a good conducting material, we would have, in addition to fluid friction damping, appreciable eddy current damping. Likewise, the shell might be made of thin hardened steel so as to produce a constant hysteresis damping component. Likewise, the inner rotor such as shown in Fig. 2 might be of hardened steel of circular cross section but not a good permanent magnet. It would tend to remain stationary when the shaft rotates by magnetic remanence, and if it rotated, a hysteresis loss would occur therein so that it could be designed to rotate with considerable liquid friction drag, and the damping would be a combination of liquid friction and hysteresis. Thus, while my invention primarily concerns a liquid friction damper, it is not necessarily confined to pure liquid friction damping but may be combined to advantage in certain cases with the other types of damping mentioned.

The relative magnitude of the fluid friction damping at any speed will be determined by the viscosity of the liquid used, the area of liquid contact with the friction surfaces, the degree of roughness of the friction surfaces, average radius at which the friction occurs, etc., and may be varied considerably by design. So long at the magnetic field is sufficient to hold the rotor from rotating, its strength will not influence fluid friction damping. It will, however, influence eddy current and hysteresis damping components if present, and in the case of a hysteresis rotor the strength of the field will influence hysteresis and hence the relative speed of rotor and surrounding shell, and hence, liquid friction damping. It will thus be evident that the designer has considerable choice as to the damping characteristics to be built into this relatively simple device.

What I claim as new and desire to secure by Letters Patent of the United States is:

1. A rotatable shaft and a damper therefor comprising a hollow liquid-tight sealed section of such shaft symmetrical with the shaft's axis of rotation, a magnetic rotor element freely rotatively mounted with respect to said shaft on the axis of rotation of said shaft within said hollow section, a nonmagnetic liquid filling the remainder of said hollow shaft section, and stationary magnet means external to and out of contact with said shaft section for resisting rotation of the internal magnetic rotor element at all times when said shaft is rotated.

2. A rotatable shaft and a damper therefor comprising a hollow liquid-tight sealed section of such shaft having a cavity symmetrical with the axis of rotation of said shaft, magnetic rotor means freely pivoted for rotation within said cavity on said axis of rotation, oil free from magnetic material filling the remainder of said cavity, and magnetic stator means adjacent and external to said hollow shaft section and out of contact therewith for maintaining said internal magnetic rotor means stationary when said shaft is rotated, at least one of said magnetic means comprising a permanent magnet for producing a flux between said stator and rotor means through the wall of said hollow shaft section.

3. A rotatable shaft and a damper therefor comprising a hollow sealed section of such shaft having a cavity symmetrical with the shaft's axis of rotation, a magnetic rotor member within said cavity, pivots for freely rotatively pivoting said rotor within said cavity on said axis of rotation, oil filling the remainder of said cavity, and stationary magnetic stator means external and adjacent said hollow shaft section and out of contact therefore magnetically cooperating with the internal magnetic rotor means to restrain rotation of the latter when the shaft is rotated, said stator means being positioned relative to said magnetic rotor to provide magnetic suspension of the latter in a manner to relieve appreciable bearing pressure at its pivots.

HAROLD T. FAUS.

REFERENCES CITED

The following references are of record in the file of this patent:

UNITED STATES PATENTS

| Number | Name | Date |
| --- | --- | --- |
| 541,641 | Still | June 25, 1895 |
| 1,472,198 | Taylor | Oct. 30, 1923 |
| 2,492,678 | Amtsberg | Dec. 27, 1949 |
| 2,514,138 | O'Connor | July 4, 1950 |
| 2,575,360 | Rabinow | Nov. 20, 1951 |